(12) United States Patent
Ritter

(10) Patent No.: US 6,183,173 B1
(45) Date of Patent: Feb. 6, 2001

(54) ROTARY SHAFT TOOL

(75) Inventor: Otto Ritter, Winterlingen (DE)

(73) Assignee: August Beck GmbH & Co., Winterlingen (DE)

( * ) Notice: Under 35 U.S.C. 154(b), the term of this patent shall be extended for 0 days.

(21) Appl. No.: 09/111,130

(22) Filed: Jul. 3, 1998

(30) Foreign Application Priority Data

Jul. 3, 1997 (DE) .............................................. 197 28 384

(51) Int. Cl.⁷ ...................................................... B23B 51/02
(52) U.S. Cl. .............................................. 408/59; 408/229
(58) Field of Search .............................. 408/59, 229, 230, 408/227

(56) References Cited

U.S. PATENT DOCUMENTS

| | | | |
|---|---|---|---|
| 308,707 | * 12/1884 | Shirk | 408/230 |
| 390,672 | * 10/1888 | Holmes | 408/230 |
| 472,541 | * 4/1892 | Johnson | 408/230 |
| 750,537 | * 1/1904 | Hanson | 408/230 |
| 2,411,209 | * 11/1946 | Hall et al. | 408/229 |
| 5,312,209 | * 5/1994 | Lindblom | 408/230 |
| 5,350,261 | * 9/1994 | Takaya et al. | 408/229 |
| 5,478,176 | * 12/1995 | Stedt et al. | 408/229 |

* cited by examiner

*Primary Examiner*—Daniel W. Howell

(57) ABSTRACT

A rotary shaft tool for machining bores, particularly blind hold bores, has a shaft with at least one longitudinal conduit for coolant/lubricant, with a cutter head that has at least one cutting edge and a chip space. A chip space section is provided that tapers toward the end of the cutter head.

6 Claims, 3 Drawing Sheets

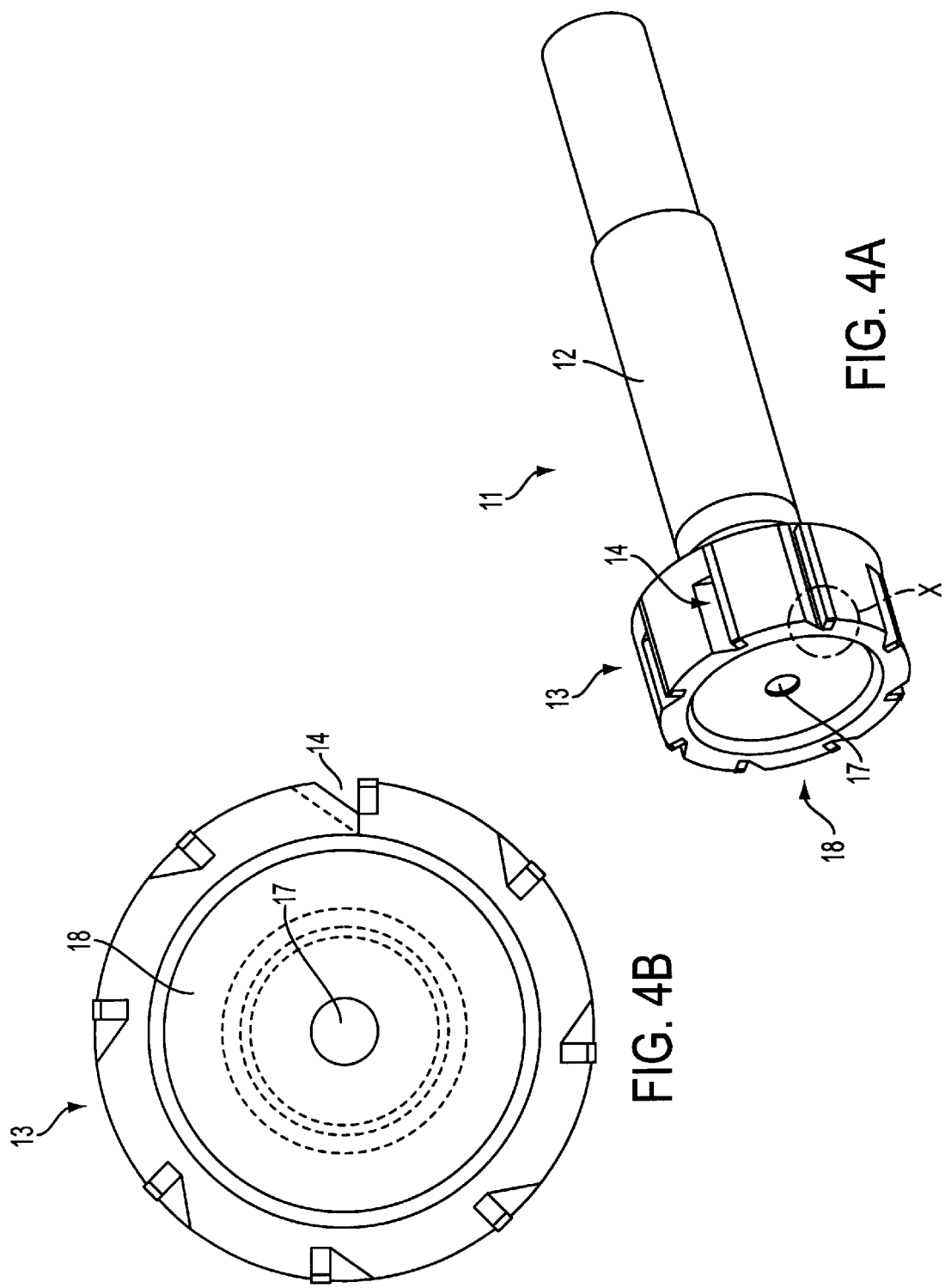

ROTARY SHAFT TOOL

BACKGROUND OF THE INVENTION

1. Field of the Invention

The invention relates to a rotary shaft tool for machining bores, and more particularly a rotary shaft tool for machining blind hole bores.

2. Discussion of Related Art

For machining bores, particularly for fine machining or high speed machining, rotary shaft tools are known that are constructed as single-blade or multi-blade reamers. The reamers have a shaft in which at least one longitudinal conduit for coolant/lubricant extends. The shaft is connected to a cutter head that has at least one chip space or chip groove. This chip space has a constant cross section, at least in the region of the main cutting edge and minor cutting edge. This continuous cross section of the chip space can merge into a chip discharge region, which is then usually enlarged in comparison with the continuous cross section of the chip space.

Such rotary shaft tools have the disadvantage that sufficient chip removal is not provided for a trouble-free operation, particularly for machining blind hole bores. Indeed, the coolant/lubricant liquid is introduced into the blind hole bore under high pressures via a longitudinal conduit, in order to be turned around in the base of the bore so that the coolant/lubricant exits upward from the blind hole bore via the chip spaces and can carry the chips away. The chips that are not carried away from the blind hole bore cause an impairment of the bore surface being machined, so that workpieces become unusable.

SUMMARY OF THE INVENTION

The object of the invention is to provide a rotary shaft tool that makes possible a more rapid and nearly complete removal of the chips, particularly in high speed machining.

This object is achieved according to the invention by a rotary shaft tool for machining bores, comprising: a shaft with at least one longitudinal conduit for coolant/lubricant, a cutter head having at least one cutting edge and a chip space with a chip space section that tapers toward an end of the cutter head.

The construction of the chip space according to the invention has the advantage that due to the tapering of the chip space at the end of the cutter head a suction action arises in the adjoining enlarged chip space because of the reduced pressure. As a result, the chips do not reach the floor of the blind hole, but are flushed out of the bore in the direction toward a tool holding fixture of the rotary tool. In addition, a venturi effect occurs during chip transport in the region of the tapered section, which is enlarged toward the following chip space section. This venturi effect, in connection with the supply of coolant/lubricant in a conduit of the shaft tool, insures carrying away the chips out of the blind hole bore.

According to an advantageous embodiment of the invention, the narrowest cross section of the tapering chip space is located in the region of the main cutting edge. Thus, a venturi effect occurs, which serves to improve carrying away the chips, in the region where the greatest part of the chips are obtained and are to be carried away, so that the effect can be substantially increased. The surface quality of the blind hole bore can thereby be improved.

According to an advantageous embodiment of the invention, the tapering section of the chip space merges into a further chip space section that preferably has a constant cross section. A simple machining of the chip space is thereby made possible. This advantageously results when the course of a side face of the inner chip space of the tapering chip space section corresponds to a diameter of a milling cutter with which the chip space is produced. Consequently a linear motion of the machining tool can be sufficient to produce the tapering of the chip space. Furthermore a path-controlled guiding of the milling cutter can be provided for the production of the chip space, in order to produce a corresponding geometry for the tapering chip space.

BRIEF DESCRIPTION OF THE DRAWING

A preferred embodiment of the invention will now be described in more detail taken together with the accompanying drawing in which:

FIGS. 4A–4B show a perspective view and plan view of the end of a cutter head according to the invention.

DETAILED DESCRIPTION OF PREFERRED EMBODIMENT

Figure 1:
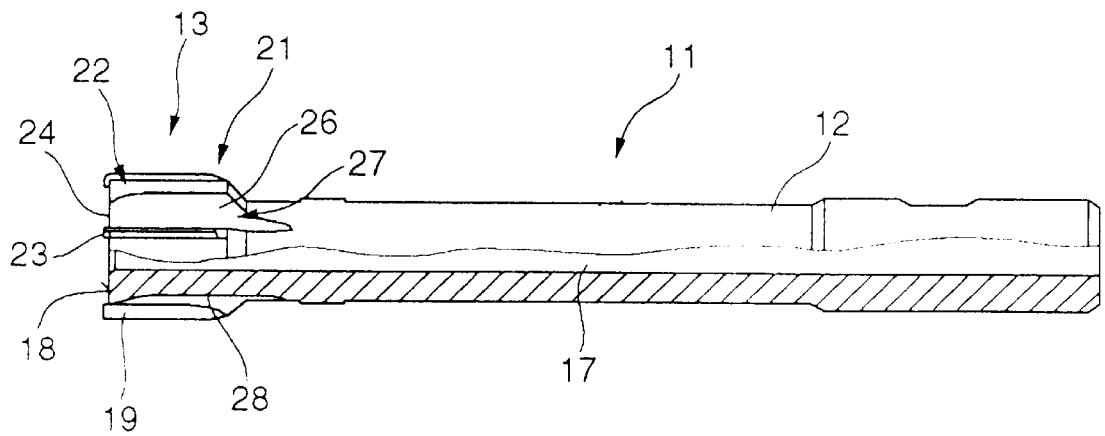
FIG. 1 shows a schematic side view of a rotary shaft tool, half in section.

A rotary shaft tool 11 is shown in FIG. 1 and FIG. 4A, and has a cylindrical shaft 12 and also a cutter head 13. The cutter head 13 can be produced as a molded head of cutting tool material and inserted into the shaft of less expensive material. The rotary cutting tool also can be produced integrally from a cutting tool material.

The cutter head 13 has chip spaces 14 on which an outlet region 16 is provided that faces toward the shaft 12. A longitudinal conduit 17 that preferably runs centrally in the shaft tool 1 1 is provided in the shaft 12 and cutter head 13, in order to conduct coolant or lubricant liquid or a cooling emulsion into the bore.

Figure 2:
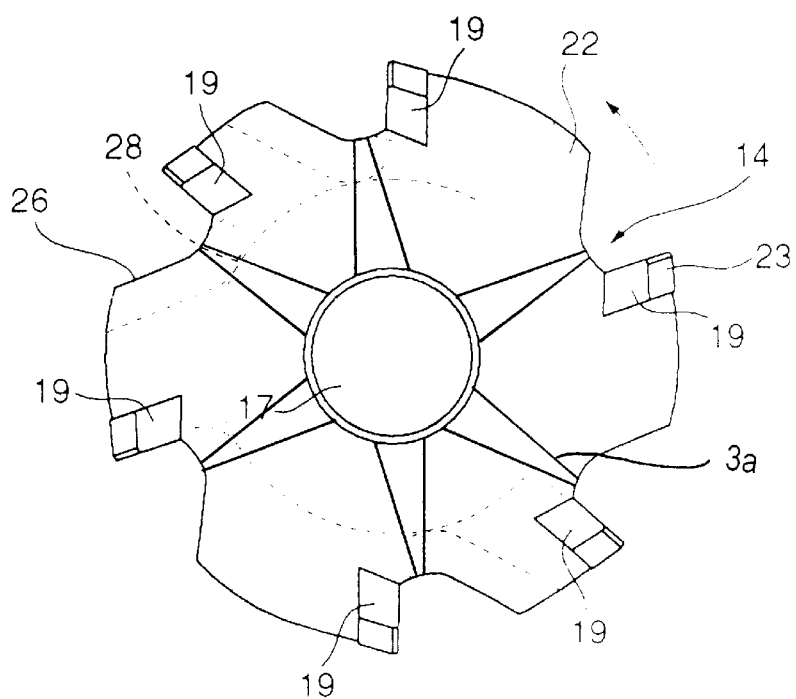
FIG. 2 shows a schematic plan view of an end of a cutter head of the shaft tool according to the invention.

FIG. 2 and FIG. 4B show a plan view of the end 18 of the cutter head 13. This cutter head has, for example, six cutting edges 19, with a preceding chip space 14 respectively associated with each. FIG. 4A and 4B show the cutter head has, for example, eight cutting edges 19. FIG. 4A identifies the portions "X" shown in enlarged detail in FIG. 3A. The present embodiment concerns a multi-blade reamer for fine machining or high speed fine machining, the use of such shaft tools being provided for blind hole bores in particular.

Figure 3C:
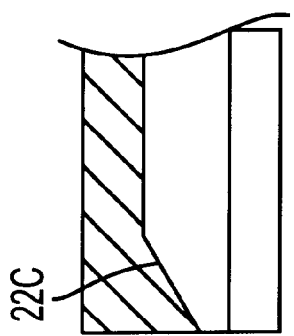
FIGS. 3A, 3B and 3C show alternate tapering chip spaces at the end of the cutter head.
Figure 3B:
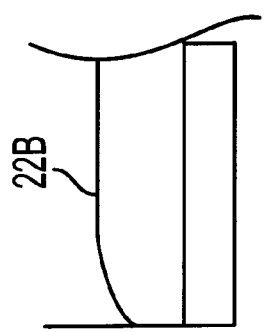
Figure 3A:
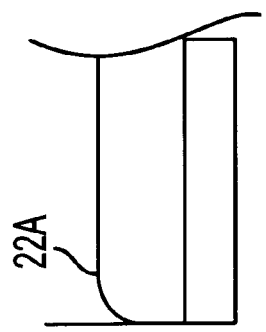

The chip space 14 has a section 21 with a constant cross section that, seen in the direction toward the end 18 of the cutter head 13, merges into a tapering chip space section 22. This section 22 has its narrowest cross section 24 in the region of a main cutting edge 23. The tapering section 22 of the chip space 14 advantageously has a uniform tapering of its cross section, so that both a side face 26 of the inner chip space 27 and a chip base 28 continuously taper. Alternatively, for example, only the side face contributes to the tapering of the chip space section 22, or else only the chip base 28 contributes to it. The taper between the narrowest cross section 24 and the section 21 of the chip space 14 can fundamentally be constructed with optional geometry as shown in FIGS. 3A–3C. However, it is important that this section 21 is made larger in cross section in comparison with the section 22, which provides a kind of nozzle shape, whence the venturi effect can be obtained, that is, a suction effect arises in the enlarged chip space section 21 due to the reduced pressure produced therein with respect to the narrowest cross section 24. The tapering chip space section 22 is advantageously constructed such that simple and rapid machining with a milling cutter is provided. Thus the chip space taper in the plane parallel to the axis of rotation can, for example, be constructed as a curvature (22A), with the external diameter of the milling cutter corresponding to the geometry of the curvature. Alternatively, an elliptical course (22B) or the like can be provided, which can be produced, for example, by path-controlled machining. Likewise, planar inclined surfaces (22C) or the like can be provided. Line A divides the chip base into a front section and a rear section, whereby the rear section is formed in a continuous manner as indicated by B and the front section of the cutter head, which is indicated by C. This description in combination with the FIGS. 3A–3C and 4A–4B show and explain the terms "curvature" (FIG. 3A), "elliptical transition" (FIG. 3B) and "inclined surfaces" (FIG. 3C).

The chip space taper 22 furthermore has the advantage that a supporting action and guiding of the chip to its removal out of the blind hole bore via the enlarged section 21 of the chip space 14 is made possible.

Recesses 30 can be provided on the end 18 of the cutter head 13, leading from the longitudinal conduit 17 to the chip space 14, whereby the feeding of the liquid can be facilitated. The recesses 30 have funnel-shaped cross-sections that taper towards the chip spaces 14.

Furthermore, alternatively, the section 21 of the chip space 14 does not have a constant cross section but is likewise widened out at the side face 26 and the chip base 28 as seen in dashed lines in FIG. 2. This widening can be constant or take place by further geometrical development.

It is important in high speed machining of blind hole bores that the chips that arise are quickly and reliably conducted out of the blind hole bore, and do not collect on the floor of the bore. To support the chip removal, coolant/lubricant under high pressure is forced into the blind hole bore via the longitudinal conduit 17 of the shaft tool 11 during fine machining or high speed fine machining. The coolant liquid emerging at the end 24 is turned around at the floor of the blind hole bore and preferably reaches the chip space 14 directly by means of the recesses on the end 18. The chips are flushed out of the blind hole bore via the larger chip space section 21 by means of the nozzle-shaped constriction of the chip space 14 or of the chip space section 21. The flushing out is reinforced by the suction effect in the enlarged chip space 21 due to the reduced pressure.

Alternatively, a tapering chip space 22 can be used in the case of plural rotary shaft tools, which are intended for use in chip-forming machining. For example, this can be provided for single-blade reamers for both fine machining and also high speed fine machining. Likewise, the chip space taper 22 can be used in drills, in particular indexable insert drills or the like.

By this design of the chip space taper 22 according to the invention, an increase in the feed during machining of the bores can furthermore be attained, since quicker and better flushing of the chips out of the blind hole bore is given. Machining times can thereby be considerably reduced, so that effectiveness can be considerably increased, with higher machining quality.

What is claimed is:

1. A rotary shaft tool for machining bores, comprising:
a shaft (12) with at least one longitudinal conduit (17) for coolant/lubricant, and a cutter head (13) having at least one cutting edge (19) and a chip space (14) with a chip space section (22) that tapers toward an end (18) of said cutter head (13), in which:
said cutter head (13) has a main cutting edge (23), and a narrowest cross section (24) of said chip space (14) is located in the region of said main cutting edge (23),
said chip space section (22) has a nozzle shape between said narrowest cross section (24) of said chip space (14) and an adjoining section (21) of said chip space (14), and
said adjoining section (21) of said chip space (14) has a larger cross section than said narrowest cross section (24).

2. The rotary shaft tool according to claim 1, in which said adjoining section (21) of said chip space (14) has a continuous taper due to a widening between a side face (26) of an inner chip space (27) and a chip base (28).

3. The rotary shaft tool according to claim 1, in which said chip space taper toward an end (18) of said cutter head (13) is formed as a curvature or as inclined surfaces or as an elliptical transition.

4. The rotary shaft tool according to claim 1, further comprising recesses on an end (18) of said cutter head (13), leading from an opening of said longitudinal conduit (17) for coolant/lubricant to a narrowest cross section (24) of said chip space (14).

5. The rotary shaft tool according to claim 4, in which said recesses have a funnel-shaped cross section that tapers toward said chip space (14).

6. The rotary shaft toll according to claim 1, in which said adjoining section (21) of said chip space (14) has a constant cross section.

* * * * *